(12) United States Patent
Wen et al.

(10) Patent No.: US 12,021,465 B2
(45) Date of Patent: Jun. 25, 2024

(54) DC MOTOR DRIVING SYSTEM AND METHOD

(71) Applicant: Delta Electronics, Inc., Taoyuan (TW)

(72) Inventors: Sheng-Yu Wen, Taoyuan (TW); Cheng-Yi Lin, Taoyuan (TW); Yi-Han Yang, Taoyuan (TW); Ting-Yun Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/836,247

(22) Filed: Jun. 9, 2022

(65) Prior Publication Data

US 2023/0299701 A1  Sep. 21, 2023

(30) Foreign Application Priority Data

Mar. 18, 2022  (CN) .......................... 202210268737.6

(51) Int. Cl.
*H02P 27/02*  (2016.01)
*H02P 23/14*  (2006.01)

(52) U.S. Cl.
CPC .................................... *H02P 23/14* (2013.01)

(58) Field of Classification Search
CPC ...... H02P 23/14; H02J 7/0068; H02J 2207/20
USPC ....................................................... 318/504
See application file for complete search history.

(56) References Cited

U.S. PATENT DOCUMENTS

| 5,528,485 A * | 6/1996 | Devilbiss ................ F25B 21/02 318/800 |
| 8,395,277 B2 | 3/2013 | Yamakawa et al. |
| 2003/0234627 A1 | 12/2003 | Reinhold et al. |
| 2004/0022115 A1* | 2/2004 | Park ....................... G11C 29/12 365/201 |
| 2013/0094247 A1* | 4/2013 | Kleinpenning ... H02M 3/33523 363/16 |

(Continued)

FOREIGN PATENT DOCUMENTS

| CN | 102055387 A | 5/2011 |
| CN | 110601530 A | 12/2019 |
| JP | 6819412 B2 | 1/2021 |

(Continued)

*Primary Examiner* — Gabriel Agared
(74) *Attorney, Agent, or Firm* — KIRTON McCONKIE; Evan R. Witt

(57) ABSTRACT

The present disclosure provides a DC motor driving system including a DC motor, a power supply device, a switch circuit, and a microprocessor. The power supply device provides an input electrical energy. The switch circuit receives the input electrical energy and outputs a motor electrical energy, which includes a motor power and a motor voltage, to the DC motor. The DC motor driving system switchably works in a constant-voltage mode, a first variable-voltage mode, or a second variable-voltage mode. In the constant-voltage mode, the input electrical energy remains unchanged. In the first variable-voltage mode, the microprocessor controls the power supply device to adjust the input electrical energy for increasing the motor voltage and the motor power. In the second variable-voltage mode, the microprocessor controls the power supply device to adjust the input electrical energy for decreasing the motor voltage and keeping the motor power unchanged.

15 Claims, 7 Drawing Sheets

(56) References Cited

U.S. PATENT DOCUMENTS

2019/0317581 A1\* 10/2019 Elghrawi ................ G06F 1/266
2021/0152105 A1    5/2021 Froelich

FOREIGN PATENT DOCUMENTS

| TW | 200929843 A | 7/2009 |
| TW | I313535 B | 8/2009 |
| TW | 201539968 A | 10/2015 |
| TW | I520478 B | 2/2016 |
| WO | 0064039 A1 | 10/2000 |

\* cited by examiner

DC MOTOR DRIVING SYSTEM AND METHOD

CROSS-REFERENCE TO RELATED APPLICATION

This application claims priority to China Patent Application No. 202210268737.6, filed on Mar. 18, 2022, the entire contents of which are incorporated herein by reference for all purposes.

FIELD OF THE INVENTION

The present disclosure relates to a motor driving system and method, and more particularly to a DC motor driving system and method.

BACKGROUND OF THE INVENTION

Conventionally, the DC motor is usually driven by a constant voltage. Under this driving condition, there is a specific relation curve between the rotational speed and the torque of the motor, as shown in FIG. 1. Accordingly, the required torque can be obtained by adjusting the rotational speed. However, if the motor operates with the maximum torque, the torque of the motor cannot be further increased.

Therefore, there is a need of providing a DC motor driving system and method in order to overcome the drawbacks of the conventional technologies.

SUMMARY OF THE INVENTION

The present disclosure provides a DC motor driving system and method. Based on the variable-voltage characteristic of the power supply device, the DC motor driving system and method varies the relation curve between the rotational speed and the torque of the DC motor through adjusting the motor voltage, thereby increasing the maximum torque of the DC motor. Consequently, the applicability of the DC motor is enhanced.

In accordance with an aspect of the present disclosure, a DC motor driving system is provided. The DC motor driving system includes a DC motor, a power supply device, a switch circuit, and a microprocessor. The power supply device is configured to provide an input electrical energy. The switch circuit is electrically connected between the power supply device and the DC motor for receiving the input electrical energy and outputting a motor electrical energy to the DC motor. The motor electrical energy includes a motor power and a motor voltage. The microprocessor is electrically connected to the switch circuit for controlling operation of switches in the switch circuit, and the microprocessor and the power supply device are in communication with each other. The DC motor driving system switchably works in a constant-voltage mode, a first variable-voltage mode, or a second variable-voltage mode. When the DC motor driving system works in the constant-voltage mode, the input electrical energy provided by the power supply device remains unchanged. When the DC motor driving system works in the first variable-voltage mode, the microprocessor transmits a first adjusting signal to the power supply device, and the power supply device adjusts the input electrical energy according to the first adjusting signal for increasing the motor voltage and the motor power. When the DC motor driving system works in the second variable-voltage mode, the microprocessor transmits a second adjusting signal to the power supply device, and the power supply device adjusts the input electrical energy according to the second adjusting signal for decreasing the motor voltage and keeping the motor power unchanged.

In accordance with another aspect of the present disclosure, a DC motor driving method is provided. The DC motor driving method includes steps (a), (b), (c), and (d). In the step (a), a DC motor, a power supply device, a switch circuit, and a microprocessor are provided. The power supply device is configured to provide an input electrical energy. The switch circuit is electrically connected between the power supply device and the DC motor to receive the input electrical energy and output a motor electrical energy to the DC motor. The motor electrical energy includes a motor power and a motor voltage. The microprocessor is electrically connected to the switch circuit for controlling operation of switches in the switch circuit, and the microprocessor and the power supply device are in communication with each other. In the step (b), a constant-voltage mode is performed, and the input electrical energy provided by the power supply device is controlled to remain unchanged. In the step (c), a first variable-voltage mode is performed, the microprocessor is controlled to transmit a first adjusting signal to the power supply device, and the power supply device is controlled to adjust the input electrical energy according to the first adjusting signal for increasing the motor voltage and the motor power. In the step (d), a second variable-voltage mode is performed, the microprocessor is controlled to transmit a second adjusting signal to the power supply device, and the power supply device is controlled to adjust the input electrical energy according to the second adjusting signal for decreasing the motor voltage and keeping the motor power unchanged.

In accordance with further another aspect of the present disclosure, a DC motor driving system is provided. The DC motor driving system is electrically connected to a power supply device configured to provide an input electrical energy. The DC motor driving system includes a DC motor, a power supply device, a switch circuit, and a microprocessor. The switch circuit is electrically connected between the power supply device and the DC motor for receiving the input electrical energy and outputting a motor electrical energy to the DC motor. The motor electrical energy includes a motor power and a motor voltage. The microprocessor is electrically connected to the switch circuit for controlling operation of switches in the switch circuit, and the microprocessor and the power supply device are in communication with each other. The DC motor driving system switchably works in a constant-voltage mode, a first variable-voltage mode, or a second variable-voltage mode. When the DC motor driving system works in the constant-voltage mode, the input electrical energy provided by the power supply device remains unchanged. When the DC motor driving system works in the first variable-voltage mode, the microprocessor transmits a first adjusting signal to the power supply device, and the power supply device adjusts the input electrical energy according to the first adjusting signal for increasing the motor voltage and the motor power. When the DC motor driving system works in the second variable-voltage mode, the microprocessor transmits a second adjusting signal to the power supply device, and the power supply device adjusts the input electrical energy according to the second adjusting signal for decreasing the motor voltage and keeping the motor power unchanged.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
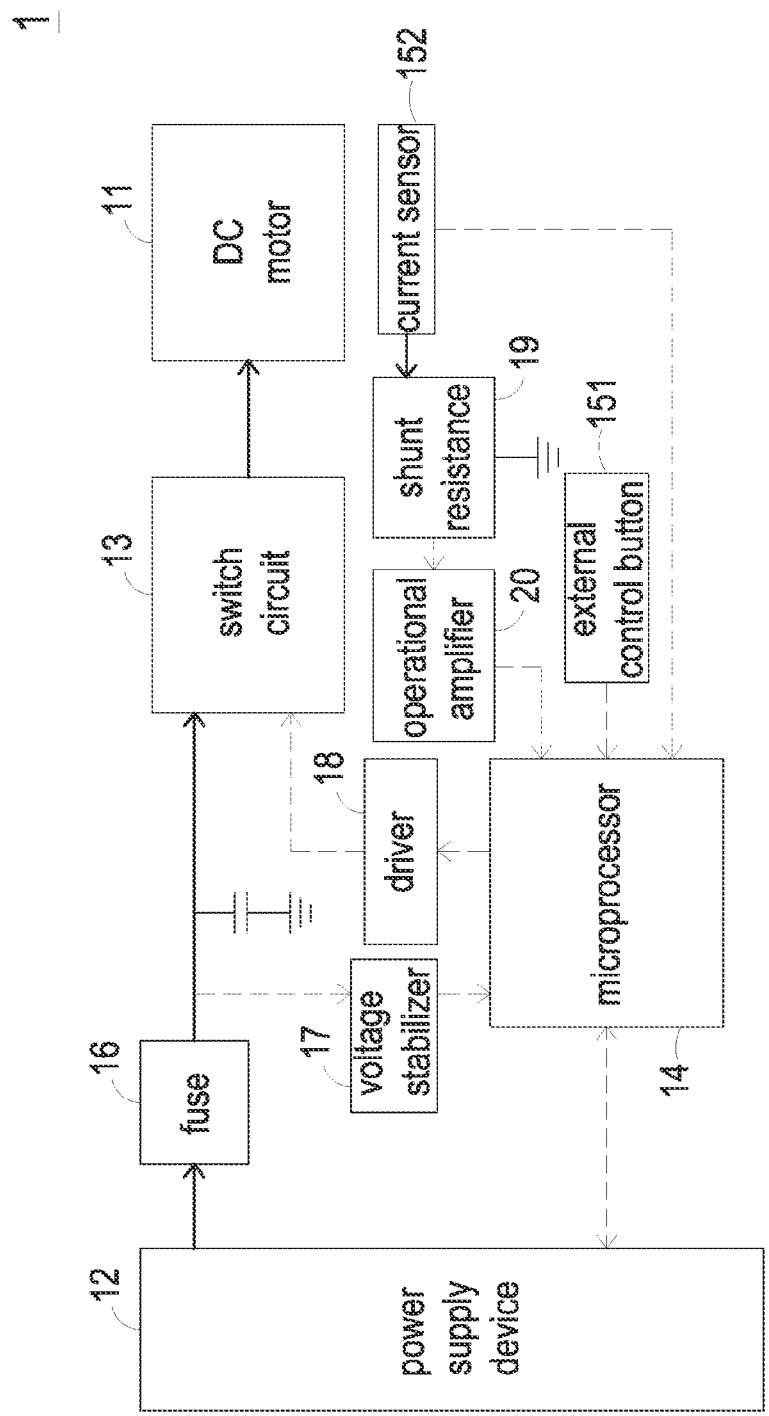
FIG. 2 is a schematic block diagram illustrating a DC motor driving system according to an embodiment of the present disclosure.

FIG. 2 is a schematic block diagram illustrating a DC motor driving system according to an embodiment of the present disclosure. In FIG. 2, the electrical energy transmission path is depicted by solid lines, and the signal transmission path is depicted by dashed lines. As shown in FIG. 2, the DC motor driving system 1 includes a DC motor 11, a power supply device 12, a switch circuit 13, and a microprocessor 14. The power supply device 12 is configured to provide an input electrical energy. The power supply device 12 may adopt a USB PD (universal serial bus power delivery) standard, but not limited thereto. The switch circuit 13 is electrically connected between the power supply device 12 and the DC motor 11 to receive the input electrical energy from the power supply device 12 and output a motor electrical energy to the DC motor 11, and the motor electrical energy includes a motor power and a motor voltage. The microprocessor 14 is electrically connected to the switch circuit 13 for controlling the operation of the switches in the switch circuit 13. Further, the microprocessor 14 and the power supply device 12 are in communication with each other, namely there is a two-way communication between the microprocessor 14 and the power supply device 12. The DC motor driving system 1 switchably works in a constant-voltage mode, a first variable-voltage mode, or a second variable-voltage mode.

Figure 1:
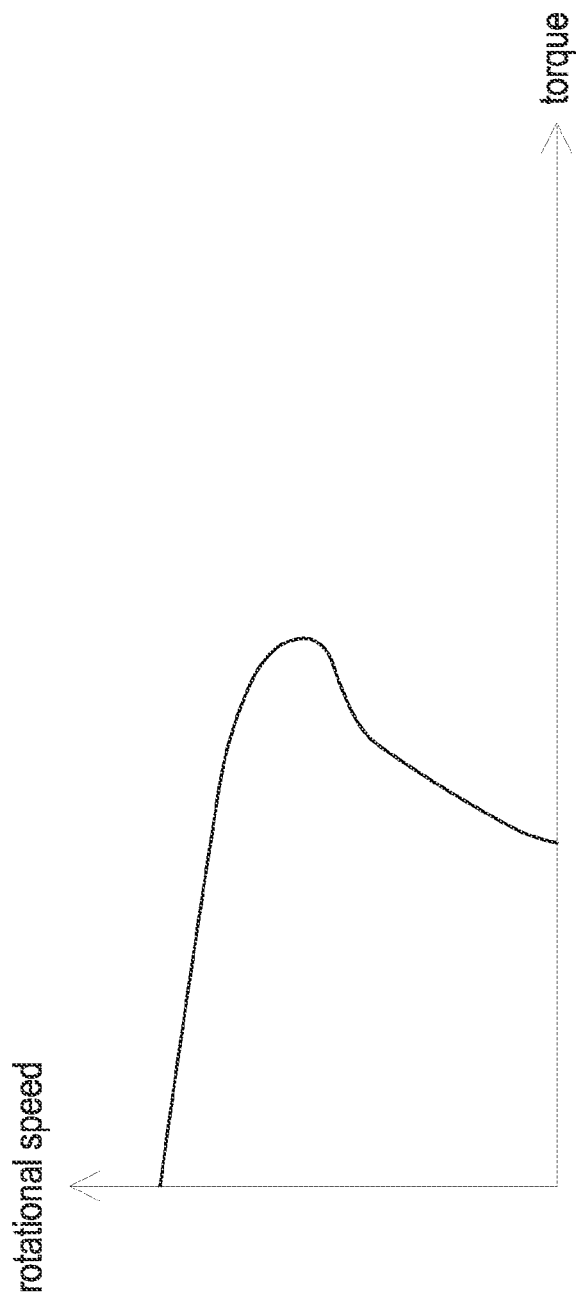
FIG. 1 schematically shows a relation curve between the rotational speed and the torque of the DC motor driven by a constant voltage.

When the DC motor driving system 1 works in the constant-voltage mode, the input electrical energy provided by the power supply device 12 remains unchanged, and the motor electrical energy received by the DC motor 11 remains unchanged correspondingly. In the constant-voltage mode, the relation between the rotational speed and the torque of the DC motor 11 is similar to that shown in FIG. 1.

Figure 3:
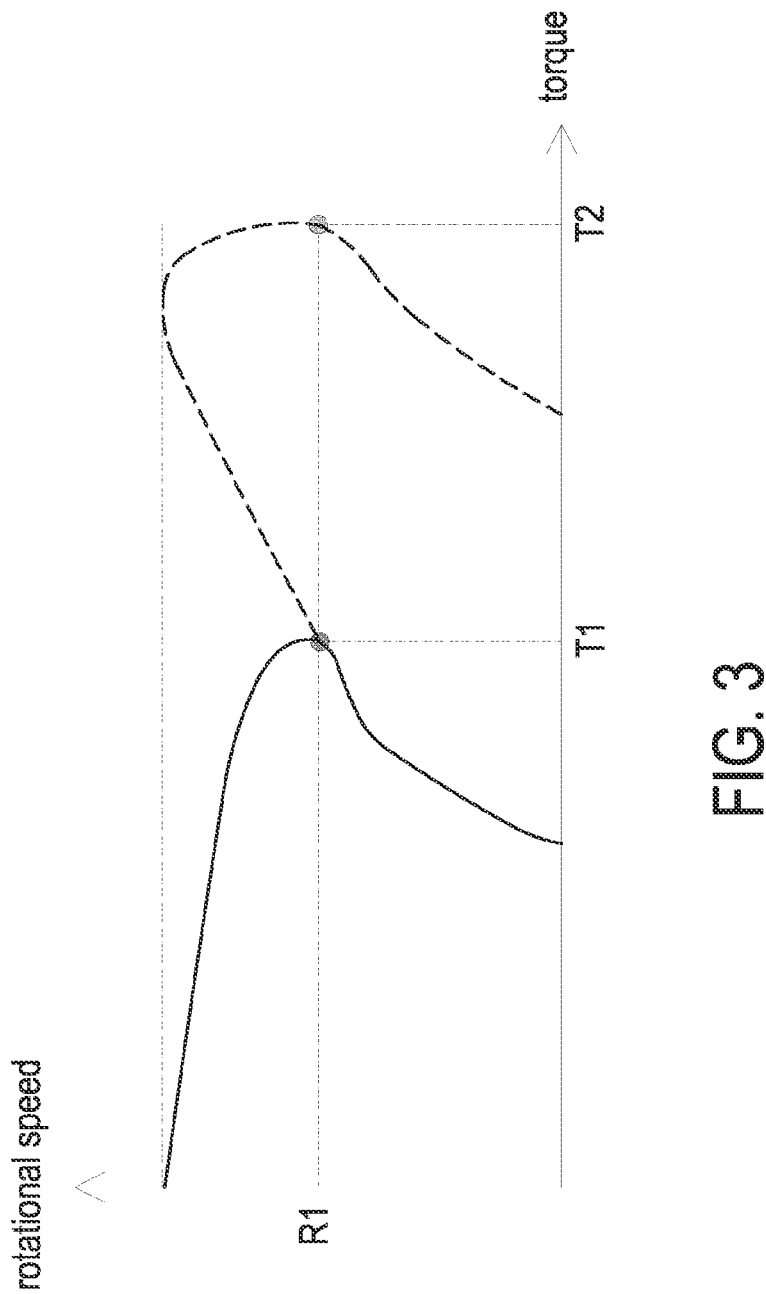
FIG. 3 schematically shows a relation curve between the rotational speed and the torque of the DC motor under the first variable-voltage mode.

When the DC motor driving system 1 works in the first variable-voltage mode, the microprocessor 14 transmits a first adjusting signal to the power supply device 12, and the power supply device 12 adjusts the input electrical energy according to the first adjusting signal for increasing the motor voltage and the motor power. FIG. 3 schematically shows a relation curve between the rotational speed and the torque of the DC motor 11 under the first variable-voltage mode. In FIG. 3, the relation curve before the power supply device 12 adjusting the input electrical energy is represented by a solid line, and the relation curve after the power supply device 12 adjusting the input electrical energy is represented by a dashed line. As shown in FIG. 3, in practical applications, when the torque of the DC motor 11 reaches its maximum value, the motor voltage is increased through adjusting the input electric energy, and the motor power is increased as well. Thereby, the relation curve between the rotational speed and the torque of the DC motor 11 is varied, and the DC motor 11 can achieve greater torque at the same rotational speed. In FIG. 3, T1 represents the maximum torque of the DC motor 11 before the motor voltage increases, T2 represents the maximum torque of the DC motor 11 after the motor voltage increases, and R1 represents the rotational speed of the DC motor 11 corresponding to the maximum torques T1 and T2.

Figure 4:
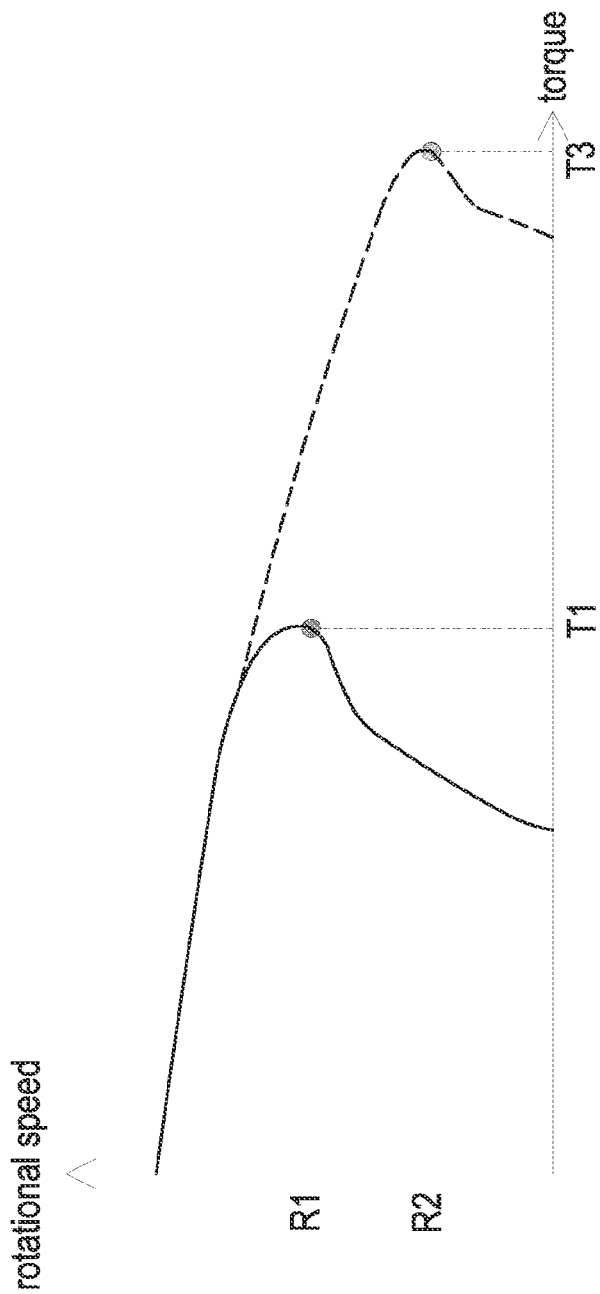
FIG. 4 schematically shows a relation curve between the rotational speed and the torque of the DC motor under the second variable-voltage mode.

When the DC motor driving system 1 works in the second variable-voltage mode, the microprocessor 14 transmits a second adjusting signal to the power supply device 12, and the power supply device 12 adjusts the input electrical energy according to the second adjusting signal for decreasing the motor voltage and keeping the motor power unchanged. FIG. 4 schematically shows a relation curve between the rotational speed and the torque of the DC motor 11 in the second variable-voltage mode. In FIG. 4, the relation curve before the power supply device 12 adjusting the input electrical energy is represented by a solid line, and the relation curve after the power supply device 12 adjusting the input electrical energy is represented by a dashed line. As shown in FIG. 4, in practical applications, when the torque of the DC motor 11 reaches its maximum value, the motor voltage is decreased through adjusting the input electric energy, and the motor power remains unchanged. Thereby, the relation curve between the rotational speed and the torque of the DC motor 11 is varied, and the DC motor 11 can achieve greater torque at a lower rotational speed. In FIG. 4, T1 represents the maximum torque of the DC motor 11 before the motor voltage decreases, T3 represents the maximum torque of the DC motor 11 after the motor voltage decreases, R1 represents the rotational speed of the DC motor 11 corresponding to the maximum torque T1, and R2 represents the rotational speed of the DC motor 11 corresponding to the maximum torque T2. In the second variable-voltage mode, after the motor voltage decreases, the DC motor 11 reaches the maximum torque at a lower rotational speed.

Therefore, based on the variable-voltage characteristic of the power supply device 12, the maximum torque of the DC motor 11 can be increased by changing the relation curve between the rotational speed and the torque of the DC motor 11 through adjusting the motor voltage. Consequently, the applicability of the DC motor 11 is enhanced.

The user may actively control to switch the work mode of the DC motor driving system 1. For example, in an embodiment, as shown in FIG. 2, the DC motor driving system 1 further includes an external control button 151, and the user may switch the DC motor driving system 1 to work in the constant-voltage mode, the first variable-voltage mode, or the second variable voltage mode through operating the external control button 151.

In addition, the microprocessor 14 also can switch the work mode of the DC motor driving system 1 according to the work state of the DC motor 11. For example, the microprocessor 14 obtains the duty cycle of the DC motor 11 and compares the duty cycle of the DC motor 11 with a preset duty cycle. If the microprocessor 14 determines that the duty cycle of the DC motor 11 is less than the preset duty cycle, the DC motor driving system 1 works in the constant-voltage mode. If the microprocessor 14 determines that the duty cycle of the DC motor 11 is greater than or equal to the preset duty cycle, which means that the DC motor 11 requires high torque to output high torque force, the DC motor driving system 1 works in the first or second variable-voltage mode. Under this circumstance, whether the DC motor driving system 1 works in the first variable-voltage mode or the second variable-voltage mode depends on the motor power of the DC motor 11. In specific, the microprocessor 14 compares the motor power with a rated power of the DC motor 11. If the motor power is less than the rated power, there is still room for increase in the motor power. Therefore, the microprocessor 14 transmits the first adjusting signal to the power supply device 12 so that the DC motor driving system 1 works in the first variable-voltage mode. If the motor power is equal to the rated power, the motor power can't be further increased. Therefore, the microprocessor 14 transmits the second adjusting signal to the power supply device 12 so that the DC motor driving system 1 works in the second variable-voltage mode.

In an embodiment, as shown in FIG. 2, the DC motor driving system 1 further includes a current sensor 152. The current sensor 152 is for example but not limited to a Hall sensor. The current sensor 152 is configured to sense the current of the DC motor 11 and transmit a sensing signal to the microprocessor 14 correspondingly. The microprocessor 14 obtains the duty cycle of the DC motor 11 according to the sensing signal.

Figures 5A, 5B:
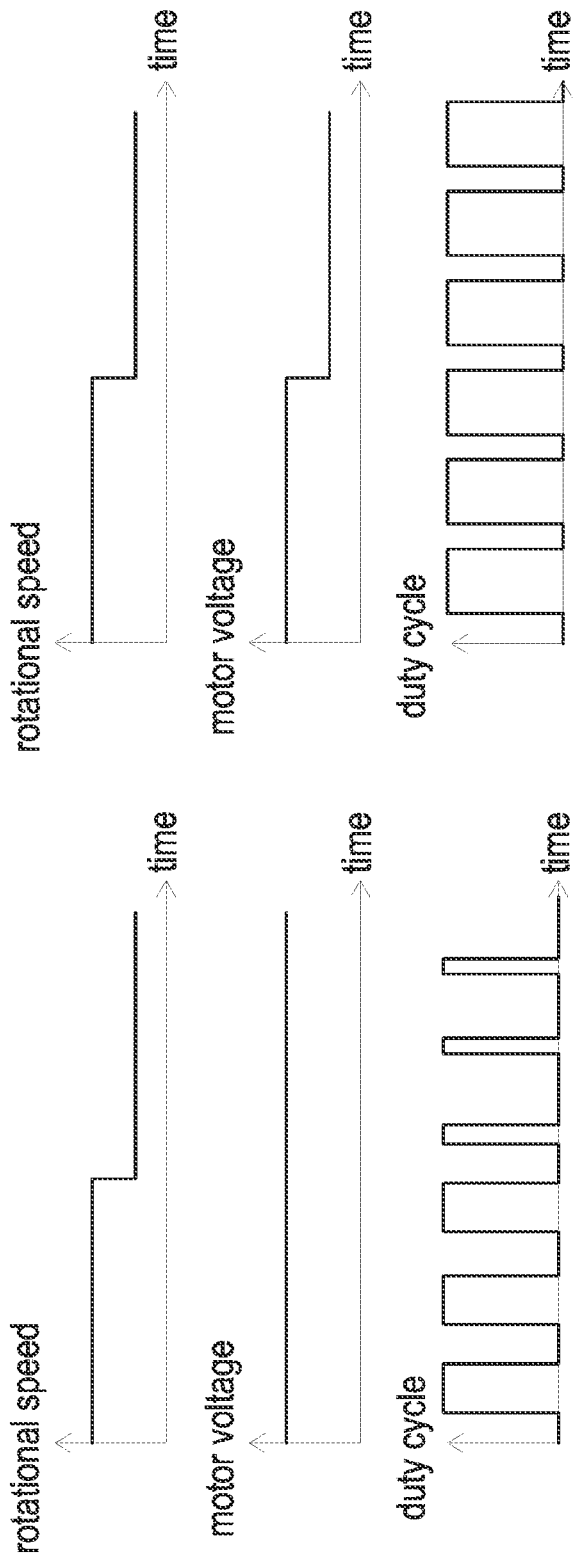
FIG. 5A schematically shows a relation between the rotational speed, the motor voltage, and the duty cycle of the DC motor driven by a constant voltage.
FIG. 5B schematically shows a relation between the rotational speed, the motor voltage, and the duty cycle of the DC motor driven by a variable voltage.

FIG. 5A schematically shows a relation between the rotational speed, the motor voltage, and the duty cycle of the DC motor 11 driven by a constant voltage. FIG. 5B schematically shows a relation between the rotational speed, the motor voltage, and the duty cycle of the DC motor 11 driven by a variable voltage. As shown in FIG. 5A, in the case that the DC motor 11 is driven by a constant voltage, when the rotational speed of the DC motor 11 decreases, the duty cycle of the DC motor 11 decreases since the motor voltage remains unchanged. In the present disclosure, as shown in FIG. 5B, when the rotational speed of the DC motor 11 decreases, the microprocessor 14 controls the power supply device 12 to adjust the input electrical energy through signal transmission, thereby decreasing the motor voltage and keeping the duty cycle of the DC motor 11 unchanged. It is noted that decreasing margin of the motor voltage depends on the decreasing margin of the rotational speed of the DC motor 11. Consequently, the DC motor 11 always achieves good duty cycle at different rotational speeds, thereby reducing harmonics and improving overall efficiency.

Please refer to FIG. 2 again. In an embodiment, the DC motor driving system 1 further includes a fuse 16 disposed on the electrical energy transmission path between the power supply device 12 and the switch circuit 13 to provide current protection. In an embodiment, the DC motor driving system 1 further includes a voltage stabilizer 17 electrically connected between the power supply device 12 and the microprocessor 14. In an embodiment, the DC motor driving system 1 further includes a driver 18, and the microprocessor 14 controls the switches in the switch circuit 13 through the driver 18. In an embodiment, the DC motor driving system 1 further includes a shunt resistance 19 and an operational amplifier 20. The shunt resistance 19 is electrically connected to the current sensor 152, and the operational amplifier 20 is electrically connected between the shunt resistance 19 and the microprocessor 14.

In an embodiment, the power supply device 12 may be independent from the DC motor driving system 1. Under this circumstance, the DC motor driving system 1 is electrically connected to the power supply device 12. The power supply device 12 is configured to provide the input electrical energy, and the DC motor driving system 1 includes the DC motor 11, the switch circuit 13, and the microprocessor 14. Since the operation of the DC motor driving system 1 and the power supply device 12 are the same as that in the above embodiments, the detailed descriptions thereof are omitted herein.

Figure 6:
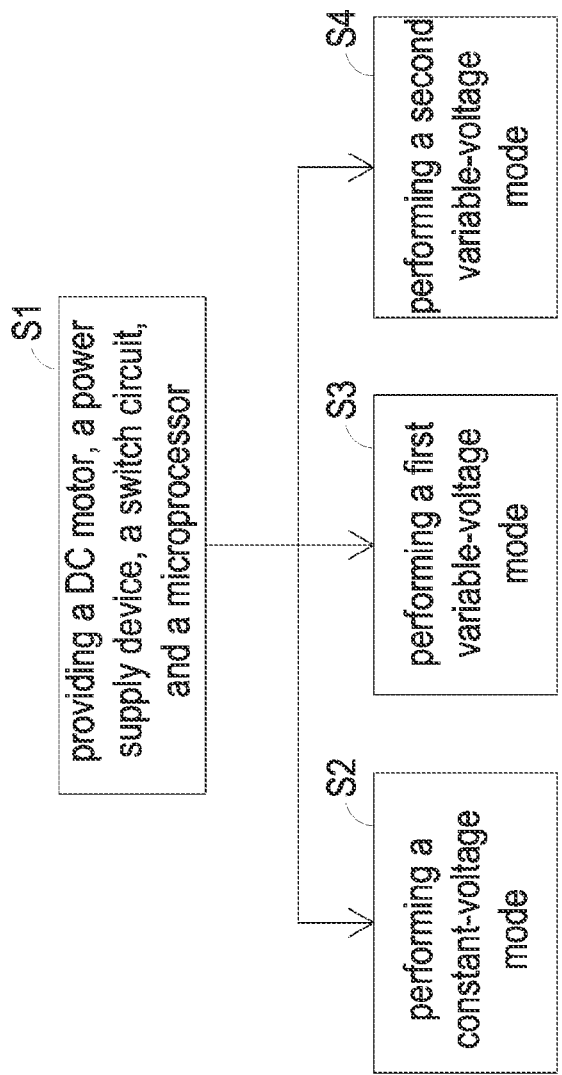
FIG. 6 is a schematic flow chart illustrating a DC motor driving method according to an embodiment of the present disclosure.

FIG. 6 is a schematic flow chart illustrating a DC motor driving method according to an embodiment of the present disclosure. The DC motor driving method of the present application can be applied to the above-mentioned DC motor driving system 1. As shown in FIG. 6, the DC motor driving method includes steps S1, S2, S3, and S4.

In the step S1, a DC motor 11, a power supply device 12, a switch circuit 13, and a microprocessor 14 are provided. The power supply device 12 is configured to provide the input electrical energy. The switch circuit 13 is electrically connected between the power supply device 12 and the DC motor 11 to receive the input electrical energy and output the motor electrical energy to the DC motor 11, and the motor electrical energy includes the motor power and the motor voltage. The microprocessor 14 is electrically connected to the switch circuit 13 for controlling the operation of the switches in the switch circuit 13, and the microprocessor 14 and the power supply device 12 are in communication with each other.

In the step S2, the constant-voltage mode is performed, and the input electrical energy provided by the power supply device 12 is controlled to remain unchanged. In the step S3, the first variable-voltage mode is performed, the microprocessor 14 is controlled to transmit the first adjusting signal to the power supply device 12, and the power supply device 12 is controlled to adjust the input electrical energy according to the first adjusting signal for increasing the motor voltage and the motor power. In the step S4, the second variable-voltage mode is performed, the microprocessor 14 is controlled to transmit the second adjusting signal to the power supply device 12, and the power supply device 12 is controlled to adjust the input electrical energy according to the second adjusting signal for decreasing the motor voltage and keeping the motor power unchanged.

Figure 7:
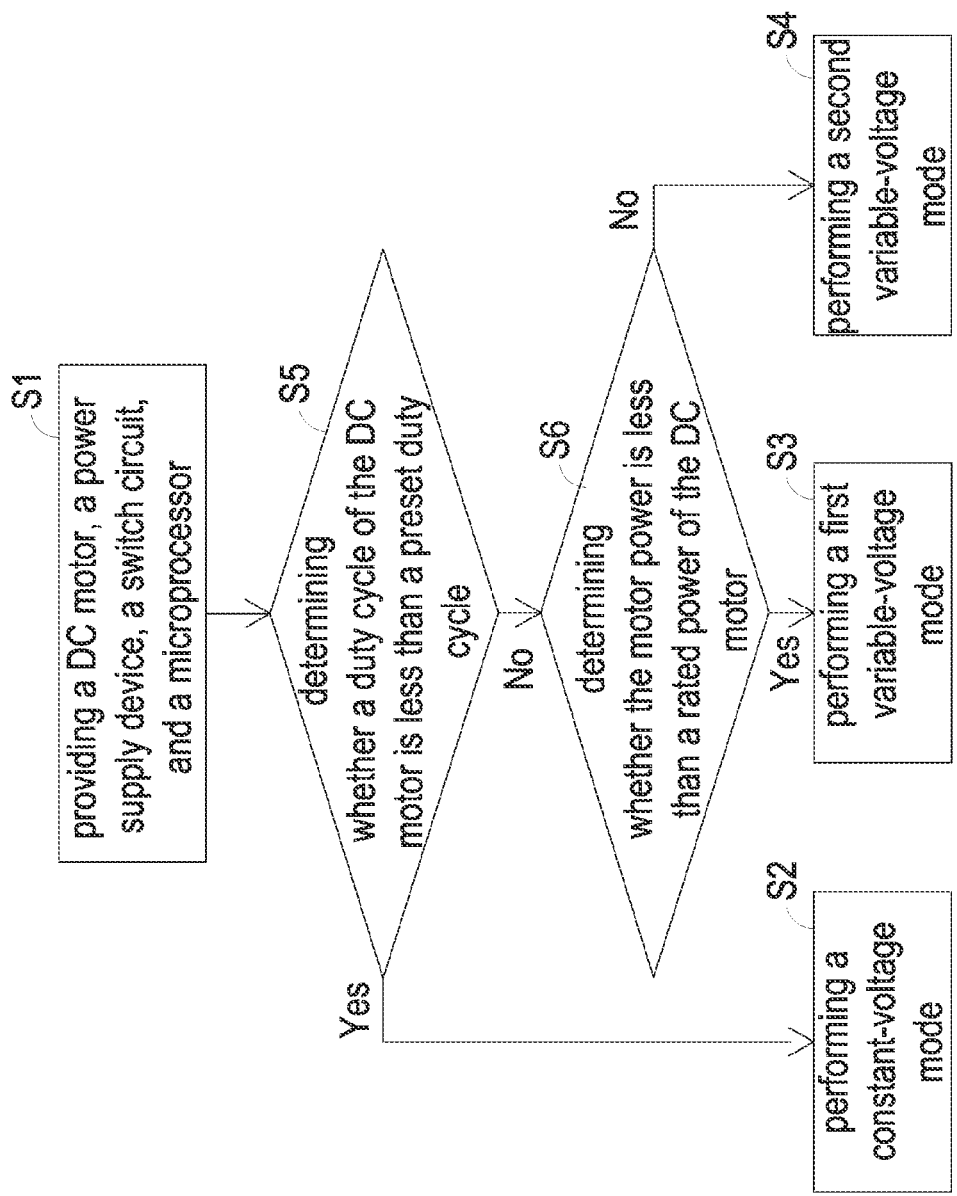
FIG. 7 is a schematic flow chart illustrating a variant of the DC motor driving method of FIG. 6.

In the DC motor driving method, the steps S2, S3, and S4 are switchably performed, and the switching between the steps S2, S3, and S4 may be controlled by the user actively or may be controlled by the microprocessor 14 according to the operation state (e.g., the duty cycle) of the DC motor 11. For example, in an embodiment, as shown in FIG. 7, the DC motor driving method further includes a step S5 of determining whether the duty cycle of the DC motor 11 is less than a preset duty cycle. If the determining result of the step S5 is satisfied, the step S2 is performed. If the determining result of the step S5 is not satisfied, the step S3 or S4 is performed. In an embodiment, the DC motor driving method further includes a step S6 of determining whether the motor power is less than the rated power of the DC motor 11 when the determining result of the step S5 is not satisfied. If the determining result of the step S6 is satisfied, the step S3 is performed. If the determining result of the step S6 is not satisfied (i.e., the motor power equals the rated power), the step S4 is performed.

In an embodiment, in the step S5, the duty cycle of the DC motor 11 is obtained according to the sensing signal transmitted by the current sensor 152 sensing the current of the DC motor 11. In an embodiment, the DC motor driving method further includes a step of controlling the microprocessor 14 to control the power supply device 12 to decrease the motor voltage when the rotational speed of the DC motor 11 decreases, so as to keep the duty cycle of the DC motor 11 unchanged.

In summary, the present disclosure provides a DC motor driving system and method. Based on the variable-voltage characteristic of the power supply device, the DC motor driving system and method varies the relation curve between the rotational speed and the torque of the DC motor through adjusting the motor voltage, thereby increasing the maximum torque of the DC motor. Consequently, the applicability of the DC motor is enhanced. In addition, when the rotational speed of the DC motor decreases, the motor voltage is decreased to keep the duty cycle of the DC motor to unchanged. Consequently, the DC motor always achieves good duty cycle at different rotational speeds, thereby reducing harmonics and improving overall efficiency.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A DC motor driving system, comprising:
   a DC motor;
   a power supply device, configured to provide an input electrical energy;
   a switch circuit, electrically connected between the power supply device and the DC motor for receiving the input electrical energy and outputting a motor electrical energy to the DC motor, wherein the motor electrical energy comprises a motor power and a motor voltage; and
   a microprocessor, electrically connected to the switch circuit for controlling operation of switches in the switch circuit, wherein the microprocessor and the power supply device are in communication with each other,
   wherein the DC motor driving system switchably works in a constant-voltage mode, a first variable-voltage mode, or a second variable-voltage mode, when the DC motor driving system works in the constant-voltage mode, the input electrical energy provided by the power supply device remains unchanged; when the DC motor driving system works in the first variable-voltage mode, the microprocessor transmits a first adjusting signal to the power supply device, and the power supply device adjusts the input electrical energy according to the first adjusting signal for increasing the motor voltage and the motor power; when the DC motor driving system works in the second variable-voltage mode, the microprocessor transmits a second adjusting signal to the power supply device, and the power supply device adjusts the input electrical energy according to the second adjusting signal for decreasing the motor voltage and keeping the motor power unchanged,
   wherein when a rotational speed of the DC motor decreases, the microprocessor decreases the motor voltage by controlling the power supply device, thereby keeping a duty cycle of the DC motor unchanged.

2. The DC motor driving system according to claim 1, wherein if the microprocessor determines that the duty cycle of the DC motor is less than a preset duty cycle, the DC motor driving system works in the constant-voltage mode; if the microprocessor determines that the duty cycle of the DC motor is greater than or equal to the preset duty cycle, the DC motor driving system works in the first or second variable-voltage mode.

3. The DC motor driving system according to claim 2, wherein when the microprocessor determines that the duty cycle of the DC motor is greater than or equal to the preset duty cycle, the microprocessor compares the motor power with a rated power of the DC motor, the microprocessor transmits the first adjusting signal to the power supply device for making the DC motor driving system work in the first variable-voltage mode when the motor power is less than the rated power, and the microprocessor transmits the second adjusting signal to the power supply device for making the DC motor driving system work in the second variable-voltage mode when the motor power is equal to the rated power.

4. The DC motor driving system according to claim 2, further comprising a current sensor, wherein the current sensor is configured to sense a current of the DC motor and transmit a sensing signal to the microprocessor, and the microprocessor obtains the duty cycle of the DC motor according to the sensing signal.

5. The DC motor driving system according to claim 1, wherein the power supply device adopts universal serial bus power delivery.

6. A DC motor driving method, comprising steps of:
   (a) providing a DC motor, a power supply device, a switch circuit, and a microprocessor, wherein the power supply device is configured to provide an input electrical energy, the switch circuit is electrically connected between the power supply device and the DC motor to receive the input electrical energy and output a motor electrical energy to the DC motor, the motor electrical energy includes a motor power and a motor voltage, the microprocessor is electrically connected to the switch circuit for controlling operation of switches in the switch circuit, and the microprocessor and the power supply device are in communication with each other;
   (b) performing a constant-voltage mode, and controlling the input electrical energy provided by the power supply device to remain unchanged;
   (c) performing a first variable-voltage mode, controlling the microprocessor to transmit a first adjusting signal to the power supply device, and controlling the power supply device to adjust the input electrical energy according to the first adjusting signal for increasing the motor voltage and the motor power; and
   (d) performing a second variable-voltage mode, controlling the microprocessor to transmit a second adjusting signal to the power supply device, and controlling the power supply device to adjust the input electrical energy according to the second adjusting signal for decreasing the motor voltage and keeping the motor power unchanged, wherein controlling the microprocessor to control the power supply device to decrease the motor voltage when a rotational speed of the DC motor decreases, so as to keep a duty cycle of the DC motor unchanged.

7. The DC motor driving method according to claim 6, further comprising steps of: (e) determining whether the duty cycle of the DC motor is less than a preset duty cycle; and (f) performing the step (b) when a determining result of the step (e) is satisfied, and performing the step (c) or (d) when the determining result of the step (e) is not satisfied.

8. The DC motor driving method according to claim 7, further comprising steps of:
   (g) comparing the motor power with a rated power of the DC motor when the determining result of the step (e) is not satisfied;
   (h) performing the step (c) when the motor power is less than the rated power; and
   (i) performing the step (d) when the motor power is equal to the rated power.

9. The DC motor driving method according to claim 7, wherein in the step (e), the duty cycle of the DC motor is obtained according to a sensing signal transmitted by a current sensor sensing a current of the DC motor.

10. The DC motor driving method according to claim 6, wherein the power supply device adopts universal serial bus power delivery.

11. A DC motor driving system, electrically connected to a power supply device configured to provide an input electrical energy, and comprising:
   a DC motor;
   a switch circuit, electrically connected between the power supply device and the DC motor for receiving the input electrical energy and outputting a motor electrical energy to the DC motor, wherein the motor electrical energy comprises a motor power and a motor voltage; and
   a microprocessor, electrically connected to the switch circuit for controlling operation of switches in the switch circuit, wherein the microprocessor and the power supply device are in communication with each other,
   wherein the DC motor driving system switchably works in a constant-voltage mode, a first variable-voltage mode, or a second variable-voltage mode, when the DC motor driving system works in the constant-voltage mode, the input electrical energy provided by the power supply device remains unchanged; when the DC motor driving system works in the first variable-voltage mode, the microprocessor transmits a first adjusting signal to the power supply device, and the power supply device adjusts the input electrical energy according to the first adjusting signal for increasing the motor voltage and the motor power; when the DC motor driving system works in the second variable-voltage mode, the microprocessor transmits a second adjusting signal to the power supply device, and the power supply device adjusts the input electrical energy according to the second adjusting signal for decreasing the motor voltage and keeping the motor power unchanged,
   wherein when a rotational speed of the DC motor decreases, the microprocessor decreases the motor voltage by controlling the power supply device, thereby keeping a duty cycle of the DC motor unchanged.

12. The DC motor driving system according to claim 11, wherein if the microprocessor determines that the duty cycle of the DC motor is less than a preset duty cycle, the DC motor driving system works in the constant-voltage mode; if the microprocessor determines that the duty cycle of the DC motor is greater than or equal to the preset duty cycle, the DC motor driving system works in the first or second variable-voltage mode.

13. The DC motor driving system according to claim 12, wherein when the microprocessor determines that the duty cycle of the DC motor is greater than or equal to the preset duty cycle, the microprocessor compares the motor power with a rated power of the DC motor, the microprocessor transmits the first adjusting signal to the power supply device for making the DC motor driving system work in the first variable-voltage mode when the motor power is less than the rated power, and the microprocessor transmits the second adjusting signal to the power supply device for making the DC motor driving system work in the second variable-voltage mode when the motor power is equal to the rated power.

14. The DC motor driving system according to claim 12, further comprising a current sensor, wherein the current sensor is configured to sense a current of the DC motor and transmit a sensing signal to the microprocessor, and the microprocessor obtains the duty cycle of the DC motor according to the sensing signal.

15. The DC motor driving system according to claim 11, wherein the power supply device adopts universal serial bus power delivery.

* * * * *